July 2, 1946.   H. P. SPARKES ET AL   2,403,132
METER MOUNTING
Filed Jan. 16, 1941   6 Sheets-Sheet 1

WITNESSES:

INVENTORS
Harry P. Sparkes and
Ernest G. Johansson.
BY
ATTORNEY

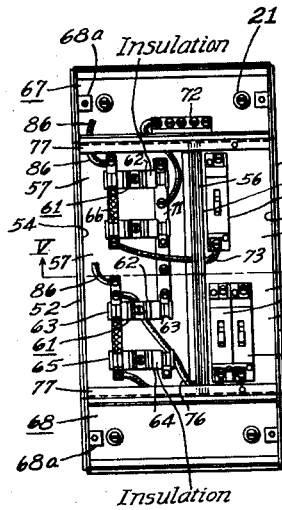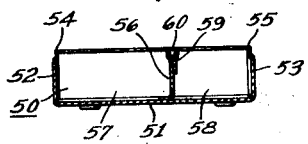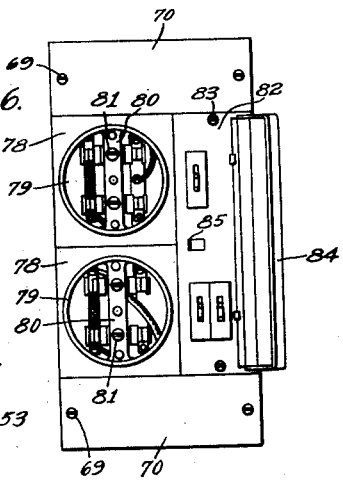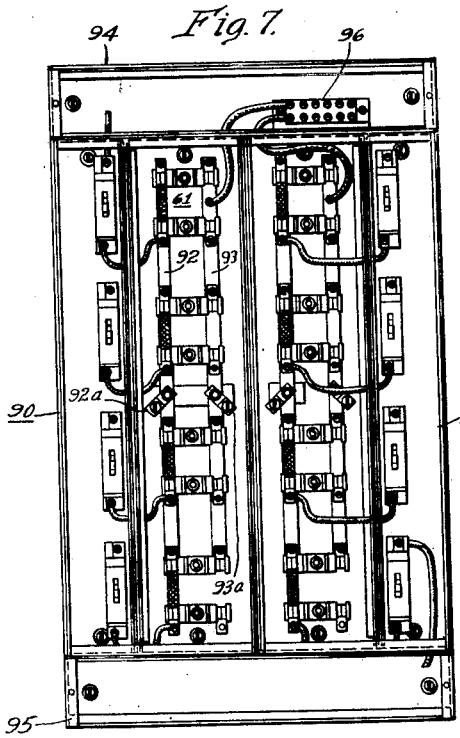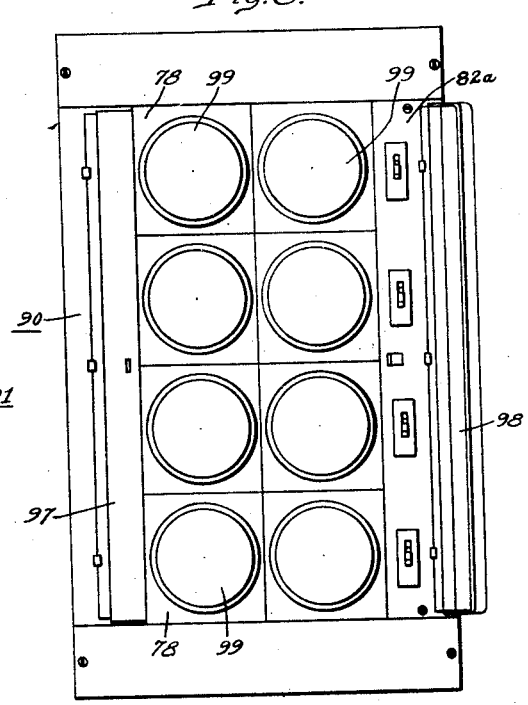

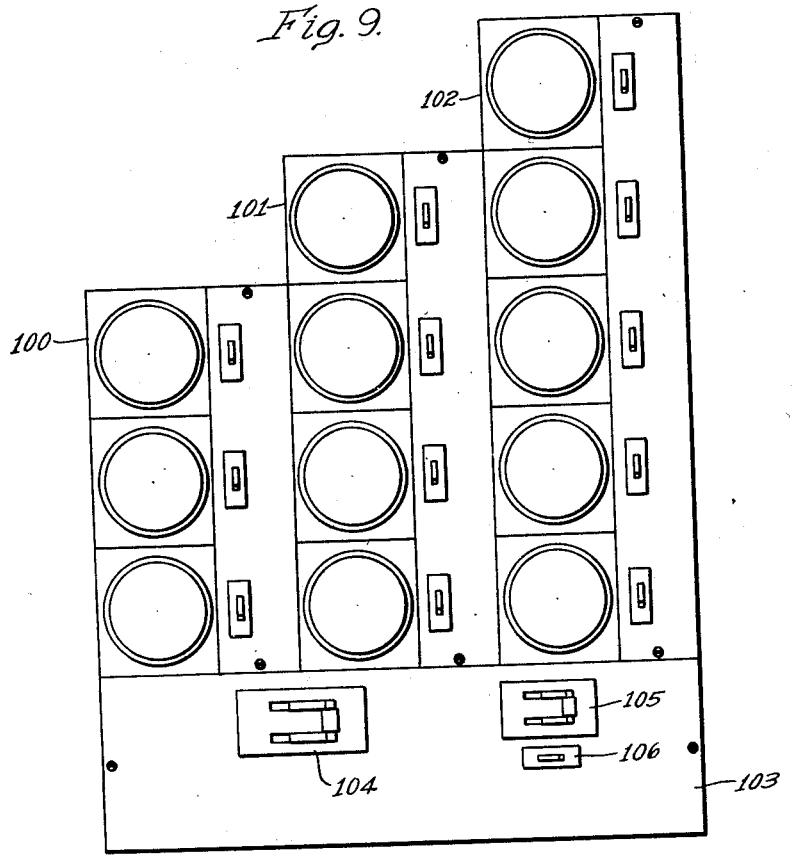
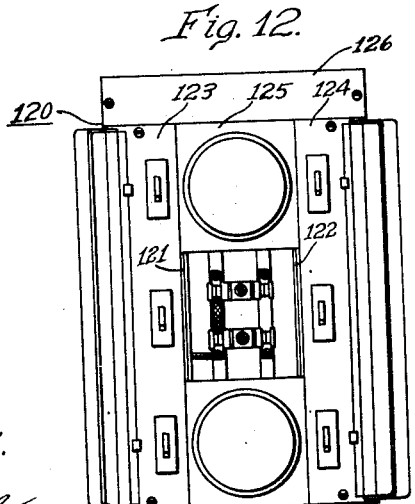

July 2, 1946.  H. P. SPARKES ET AL  2,403,132
METER MOUNTING
Filed Jan. 16, 1941  6 Sheets-Sheet 4

INVENTORS
Harry P. Sparkes and
Ernest G. Johansson.
ATTORNEY

July 2, 1946.   H. P. SPARKES ET AL   2,403,132
METER MOUNTING
Filed Jan. 16, 1941   6 Sheets-Sheet 5

WITNESSES:

INVENTORS
Harry P. Sparkes and
Ernest G. Johansson.
BY
ATTORNEY

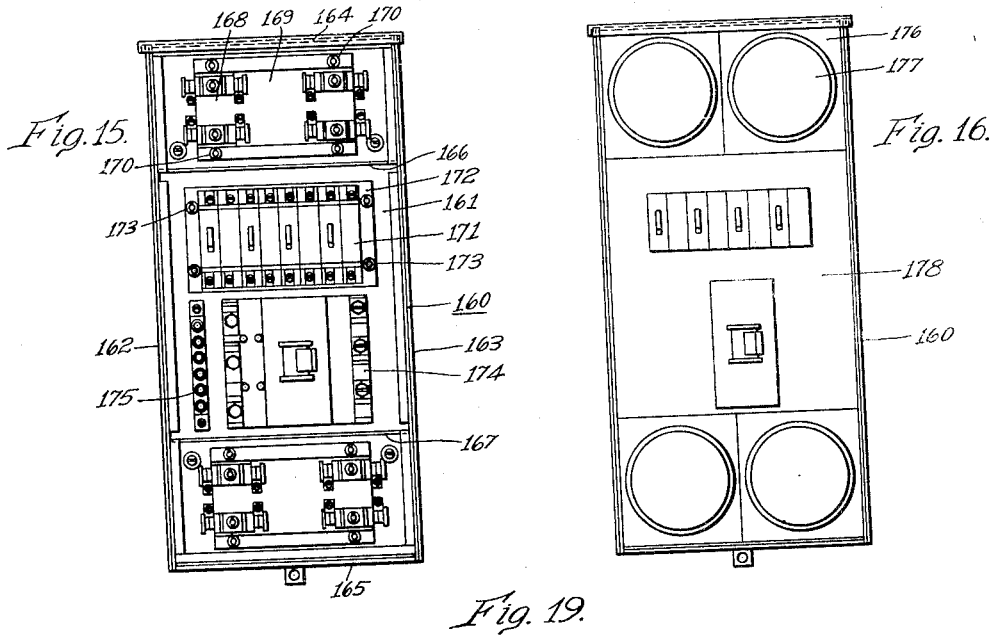

Patented July 2, 1946

2,403,132

UNITED STATES PATENT OFFICE 2,403,132

METER MOUNTING

Harry P. Sparkes, West Orange, N. J., and Ernest G. Johansson, Watertown, Mass., assignors of one-half to Westinghouse Electric Corporation, East Pittsburgh, Pa., a corporation of Pennsylvania, and one-half to Anchor Manufacturing Company, Boston, Mass., a corporation of Massachusetts Application January 16, 1941, Serial No. 374,668

17 Claims. (Cl. 175—222)

This invention relates to mountings for electrical instruments and it has particular relation to panel type mountings for detachable watthour meters.

When detachable watthour meters were first introduced, it was the custom to mount each meter in an individual socket. Examples of such installations are illustrated in the Mylius et al. Patent 1,893,177 and the Bradshaw et al. Patent 1,969,499, both assigned to the Westinghouse Electric & Manufacturing Company.

As the merits of the detachable watthour meter became recognized, numerous cases arose requiring the installation of a number of detachable watthour meters in close relationship. For this reason a mounting trough was developed having a number of spaced sockets for the reception of detachable watthour meters. An example of such a trough is shown in the Allen et al. Patent 2,076,491.

When the number of detachable watthour meters to be mounted in a single location is small, the trough type mounting is entirely adequate. In certain installations, however, a large number of detachable watthour meters must be provided. For instance, apartment houses often have all watthour meters located at a common load center and may require large numbers of such meters. In order to provide suitable mountings for such installations, it was proposed at first to construct a meter panel having a plurality of sockets for the reception of detachable watthour meters. Such a panel is illustrated in the Sparkes Patent 1,855,614. Although such a panel provides a desirable advance over the prior art, its construction is subject to a number of disadvantages. Among these may be noted the inflexibility of the design. Each of the panels is substantially an individual design which cannot be modified readily to care for variations in the number of detachable watthour meters and to care for limitations in the space available for the panel installation.

In an effort to overcome the objections of the Sparkes design, it was proposed subsequently that a plurality of spaced meter troughs be associated with a common header as illustrated in the Allen Patent 2,076,492. Although this construction afforded an increased measure of flexibility, it was objectionable for the reasons that it was difficult to provide adequate rigidity for the resulting spaced troughs, because it required an excessive amount of space and because it did not lend itself readily to factory wiring and assembly.

In accordance with the invention, a plurality of channels or trough receptacles are positioned in side-by-side abutting relationship to form a sectionalized panel. Each of the trough receptacles contains a plurality of contact units or sockets for detachably receiving detachable watthour meters. In addition, each of the contact units or sockets is provided with an adjacent electrical switch preferably of the type including both manual and automatic overload operation. Each of the sockets is provided with an independent cover whereby access to the socket is afforded without disturbance to the remaining covers.

To facilitate wiring of the panel, one or more wireways may be provided extending transversely with respect to the trough receptacles and substantially abutting the ends of the trough receptacles. Such a panel may be wired and assembled at the factory, thereby facilitating greatly the installation of the panel in the field. Moreover, the number of meter positions may be varied readily without affecting the rigidity of the resulting structure. Each panel is of unusual compact design.

According to a preferred embodiment of the invention, the electrical switches are segregated from the contact units or sockets. This permits the provision of a separate cover for a large number of electrical switches. When the panel is wired at the factory the removal of the switch covers generally suffices for completing the connections at the time of installation.

In addition, a barrier preferably may be placed between the segregated switches and the contact units or sockets. This provides adequate electrical and mechanical protection for the sockets during installation and subsequent operation and maintenance of the panel.

The invention also contemplates the provision of an improved mounting for the contact units or sockets of a detachable meter installation therewith. Both the switches for association may be mounted on a common subbase which is inserted as a unit in a trough receptacle. The wiring for the parts carried by the subbase may be provided before or after installation of the subbase at the trough receptacle.

It is therefore an object of the invention to provide an improved and a compact panel type mounting for detachable electrical instruments.

It is a further object of the invention to provide in a panel type mounting for watthour meters a plurality of trough receptacles or channels associated in abutting relationship.

It is a still further object of the invention to provide a panel type watthour meter assembly of improved design having an electrical switch adjacent each meter position.

It is another object of the invention to provide in a panel mounting for detachable watthour meters a plurality of trough receptacles in substantially abutting relationship together with wireways extending substantially perpendicular to the trough receptacles.

It is a still further object of the invention to provide a detachable watthour meter assembly having electrical switches segregated from detachable meter sockets.

It is another object of the invention to provide in a panel for detachable watthour meters a plurality of trough receptacles each having an electrical switch compartment and a socket compartment.

It is still another object of the invention to provide a subbase for mounting electrical switches and sockets for detachable watthour meters.

Other objects of the invention will be apparent from the following description taken in conjunction with the accompanying drawings in which:

Fig. 4 is a view in front elevation with covers removed of a meter panel embodying a preferred form of the invention;

Fig. 5 is a view in cross section with parts removed taken along the line V—V of Fig. 4;

Fig. 6 is a view in front elevation of the panel illustrated in Fig. 4 with the covers in place;

Fig. 7 is a view in front elevation with covers removed of a panel employing a plurality of units resembling that illustrated in Fig. 4;

Fig. 8 is a view in front elevation of the panel illustrated in Fig. 7 with the covers in place;

Figs. 9, 10 and 11 are views in front elevation of modified panels employing units resembling that illustrated in Fig. 4;

Fig. 12 is a view in front elevation with parts removed of a modified meter panel embodying the invention;

Fig. 15 is a view in front elevation with covers removed of a meter panel embodying a modified form of the invention;

Fig. 16 is a view in front elevation of the panel illustrated in Fig. 15 with the covers in place;

Fig. 17 is a view in front elevation with parts removed of a meter panel embodying a modified form of the invention;

Fig. 18 is a view in front elevation of a sub-base assembly suitable for the panel of Fig. 17, and Fig. 19 is a view in front elevation of the panel illustrated in Fig. 17 with the covers in place.

Figure 1:
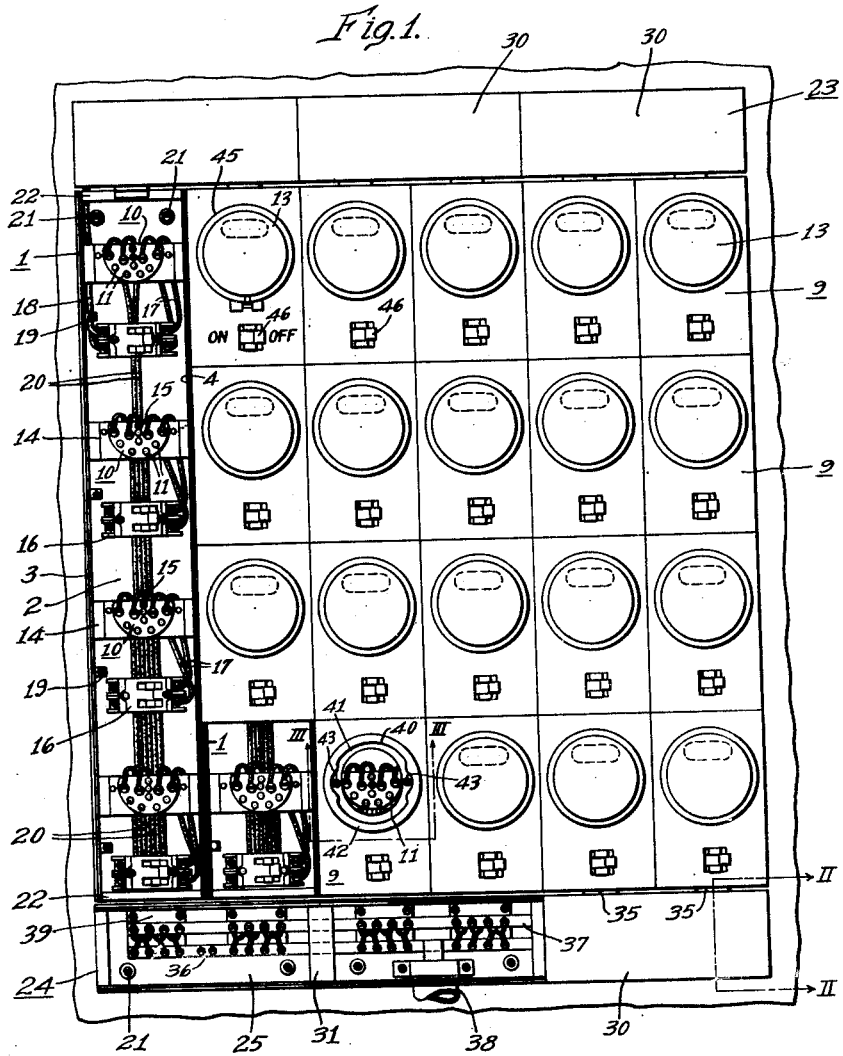
Figure 1 is a view in front elevation with parts removed of a watthour meter panel.

Referring to the drawings, Fig. 1 shows a meter panel formed from a plurality of similar trough receptacles or channels 1. Each of these trough receptacles 1 is substantially of U-shape having a base wall 2 and side walls 3 and 4. By reference to Fig. 3, it will be noted that the trough receptacles are in side-by-side abutting relationship and are attached to each other by any suitable means such as bolts 5. Each of the side walls 3 and 4 is provided with inwardly displaced edges 6 and 7. Each adjacent pair of edges 6 and 7 cooperate to form a channel for the reception of flanges 8 provided on covers 9 for the trough receptacles. A more detailed description of the covers will be furnished below.

Each of the trough receptacles 1 supports a plurality of spaced contact units or meter sockets 10. These meter sockets may vary appreciably in form. Examples of suitable sockets are illustrated in the aforesaid Mylius et al. Patent 1,893,177 and Bradshaw et al. Patent 1,969,499. For the purpose of illustration, however, the sockets of Fig. 1 are similar in substance to those illustrated in the Mylius et al. patent.

As is well understood in the art, each of the sockets 10 includes a plurality of contact jaws 11 for the reception of contact pins or blades 12 carried by a detachable watthour meter or other instrument 13. Insertion of the contact pins 12 in the jaws 11 completes an electrical circuit for the watthour meter 13.

The sockets 10 may be mounted in the trough receptacle 1 in any suitable manner as on brackets 14 having legs secured to the trough receptacle in any suitable manner as by welding. The sockets may be secured to the brackets in any desired manner as by machine screws 15.

Adjacent each of the sockets 10 an electrical switch 16 preferably is positioned within the trough receptacles. This electrical switch may be of any desired type. Preferably, however, the switch includes both automatic overload and manual control. A suitable switch for this purpose is disclosed in the Gano Patent 2,204,409, which is assigned to the Westinghouse Electric & Manufacturing Company. Another switch which may be employed is illustrated in Patent 2,132,629.

The electrical switches 16 may be placed either in the load side or the line side of the meter circuits. As illustrated, however, each switch 16 is connected through suitable conductors 17 to the load terminals on the associated socket 10. Electrical energy is supplied from the switch to a load through suitable conductors 18. These conductors may be held in place by means of brackets 19 attached to the side walls of the trough receptacles. Although either single pole or double pole switches may be employed as understood in the art, for the purpose of illustration double pole switches are shown. Electrical energy is supplied from a line circuit to the line terminals of each socket 10 through suitable conductors 20.

If desired, the construction thus far described may be mounted on a suitable wall or supporting structure S by means of machine screws or bolts 21. In such a case the load conductors 18 and the line conductors 20 may be led from each trough receptacle through suitable knockouts to load and line circuits. Each of the trough receptacles is provided with end caps 22 for completing a closure therefor.

A greater measure of flexibility in wiring is provided, however, by one or more wireways 23 and 24. It will be noted that the wireway 23 is mounted to extend across the upper ends of the trough receptacles 1, whereas the lower wireway 24 is mounted to extend across the lower ends of the trough receptacles. The construction of both wireways is substantially similar and may be understood more clearly from an inspection of Fig. 2.

Figure 2:
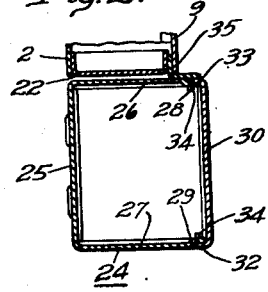
Fig. 2 is a detail view in cross section taken along the line II—II of Fig. 1.

As shown in Fig. 2, the wireway 24 includes a substantially U-shaped channel having a base wall 25 and side walls 26 and 27. Each of the side walls is provided with an inwardly displaced edge 28 and 29 for the reception of one or more covers 30. As shown in Fig. 1, three covers are provided for each of the wireways. If desired, a plate 31 may be affixed to each wireway to underlie each of the abutting junctions of the covers 30.

The covers 30 of the wireways may be secured in any suitable manner. As illustrated, the cover 30 is provided with two flanges 32 and 33 for engaging the edges 28 and 29 of the channel. One of the flanges 32 carries a plurality of pins 34 which are snugly received in openings provided in the edge 29. The remaining flange 33 of the cover is provided with one or more lugs 35 having an upstanding portion positioned behind one of the covers 9. It will be understood that to install a cover 30 the pins 34 are inserted in the openings provided in the associated flange 29 and the covers 30 are rotated to bring the lugs 35 into position against the adjacent caps 22. When the covers 9 are positioned over the lugs 35, removal of the cover plate 30 is effectively prevented.

Either or both of the wireways may be employed for circuits leading to or from the meter panel. As shown in Fig. 1, the lower wireway is provided with two line buses 36 and 37 which are connected to an external line circuit through a suitable conduit 38. The buses 36 and 37 may be supported in the wireway on suitable insulating brackets 39. A pair of the conductors 20 for each meter socket extends through knockouts provided in the caps 22 and the side wall 26 of the wireway. The conductors of each pair are connected respectively to the buses 36 and 37 for providing energy to the line terminals of each socket 10.

If desired, the load conductors 18 may be directed into the same wireway 24. However, in Fig. 1 these conductors 18 are led into the upper wireway 23. From this wireway each pair of load conductors may extend through suitable knockouts or conduits for supplying electrical loads.

As above indicated, each of the sockets 10 is provided with an independent cover 9 having an opening for the reception of a detachable watthour meter 13. This opening may be defined by a cylindrical member 40 having an inwardly turned lower flange 41 and an outwardly turned upper flange 42. The lower flange may be attached to the bracket 14 by suitable machine screws 43 for retaining the cover 9 in position. The upper flange 42 cooperates with a flange 44 provided on the detachable watthour meter 13 for positioning the watthour meter. When the watthour meter 13 has its contact pins 12 engaged within the jaws 11, the flange 44 of the watthour meter abuts the flange 42 carried by the associated cover. With the parts in this position a sealing ring 45 may be employed, as well understood in the art, to prevent unauthorized removal of the watthour meter.

It will be observed that each cover 9 also includes an opening for the operating handle 46 of one of the electrical switches 16. This permits the switch to be operated to restore service after an automatic tripping thereof, or to intentionally interrupt service when desired. The combination of these two functions in a single switch structure greatly contributes to the compactness of the resulting design and to a substantial simplification in wiring.

Figure 3:
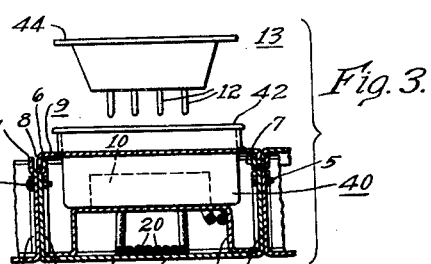
Fig. 3 is a detail view in cross section taken along the line III—III of Fig. 1.

It is believed that the assembly of the structure illustrated in Figs. 1, 2 and 3 is apparent from the foregoing description. The trough receptacles 1 may be assembled at the factory and rigidly bolted together to form a rigid panel structure. It will be understood that at the factory each of the trough receptacles is provided with brackets 14 and with sockets 10 mounted on the brackets. In addition, the electrical switches 16 are installed in each of the trough receptacles. If wireways 23 and 24 are to be employed, these are placed in position against the ends of the trough receptacles and attached thereto in any suitable manner as by welding or bolts. With the parts assembled as stated, the line buses 36 and 37 may be attached to their supporting brackets 39 and the line conductors 20 connected between the buses 36 and 37 and the respective sockets 10. Also at the factory, conductors 17 and 18 may be connected for supplying the load from each socket 10. Finally, the covers 30 for the wireways may be placed in position and the covers 9 secured over the sockets 10 to complete the factory assembly. The resulting panel may be shipped as a unit to the field for installation.

When the panel is to be installed, the necessary covers are removed to permit attachment of the panel to the supporting wall by means of the screws 21. Connections then are made from the line buses to the appropriate service line and from each pair of load conductors 18 to the appropriate load. When the covers are replaced and the meters 13 inserted in operative position, the panel is ready for service.

Although the panel illustrated in Figs. 1, 2 and 3 is a considerable advance over the prior art, still further improvements may be effected by segregating the switches and the sockets. Such segregation may be effected as illustrated in Figs. 4, 5 and 6. As shown in these figures, a trough receptacle 50 is employed which has a bottom wall 51 and side walls 52 and 53. Each of the side walls is provided with an inwardly displaced edge 54 and 55 for reception of covers. Except for width the trough receptacle 50 is similar to the trough receptacle 1 of Fig. 1. In addition, an inner partition member 56 is provided for dividing the trough receptacle 50 into two auxiliary trough receptacles or compartments 57 and 58. The partition member 56 also carries a flange 59 which cooperates therewith to define a channel 60 for the reception of suitable covers as hereinafter described.

In one of the compartments, such as the compartment 57, one or more contact units or sockets 61 are provided for the reception of detachable watthour meters. As above indicated, the specific detachable watthour meter construction selected is a matter of choice. For the purpose of illustration, however, the socket 61 resembles that illustrated in the aforesaid Bradshaw et al. Patent 1,969,499. Each socket includes a line insulating block 62 carrying two contact jaws 63. Each socket also includes a load insulating block 64 provided with two contact jaws 65. As understood in the art, the contact jaws 63 and 65 cooperate to receive the contact blades of a detachable watthour meter. For completeness in illustration, each of the sockets 61 is illustrated as including a circuit closer 66 which may be of the type illustrated in the Bradshaw et al. Patent 2,096,479.

Although wiring for the socket 61 could be effected by extending conductors through knockouts in the trough receptacle 50, such wiring is greatly facilitated by the provision of one or more wireways 67 and 68. These wireways are generally of box formation and have lugs 68a for the reception of machine screws 69 employed for attaching wireway covers 70 thereto. From an inspection of Fig. 4, it will be noted that one of the contact jaws 63 on each of the sockets 61 is connected through a bus 71 to a terminal block 72. As is understood in the art, the remaining contact jaws 63 are connected to one line conductor and the terminal block 72 is connected to a second line conductor for supplying electrical energy from the line conductor through the meters to various loads.

One of the load contact jaws on each socket 61 is connected through a suitable conductor 73 to an electrical switch 74 which may be of the single pole type similar to that disclosed in either of the aforesaid Patents 2,204,409 or 2,132,629. Each of the sockets 61 may be connected to a load by attaching one of the load conductors to the terminal block 72 and by attaching the remaining load conductor to the free terminal of the switch 74. Although different numbers of contact jaws may be required, depending on the specific service desired, for the two wire service herein illustrated the remaining contact jaw 65 need not be employed.

It will be noted that a second switch 75 is provided for one of the sockets 61. This switch, if desired, may be connected to one of the line conductors through a conductor 76 for the purpose of supplying an unmetered load. For this purpose the unmetered load circuit may be connected to the terminal block 72 and to the free terminal of the switch 75. The various conductors 73 and 76 extend through the partition member 56 through knockouts provided therein. Insulating bushings may be provided if desired in the partition member 56 for the various conductors extending therethrough. Similarly the connections from either of the compartments 57 or 58 may extend through knockouts provided in end caps 77 attached to each end of the trough receptacle 50 and through knockouts provided in the adjacent wall of the wireway being employed. Attachment screws 21 may again be employed for attaching the panel of Fig. 4 to a supporting wall. It will be understood that the various parts such as the wireways, and caps and trough receptacles may be attached to each other in any suitable manner as by bolts.

By reference to Fig. 6, it will be noted that each of the sockets 61 may be provided with an independent cover 78 having a flanged opening 79 for the reception of a detachable watthour meter. The cover may include a cross bar 80 through which machine screws 81 extend for attaching each cover to the associated socket 61.

In addition, the compartment 58 is provided with a separate cover 82 which is attached to the through receptacle by suitable machine screws 83. As in the case of the panel shown in Fig. 1, these covers 78 and 82 preferably have flanges cooperating with the edges 54 and 55 and extending into the channel 60 for sealing effectively the trough receptacle.

It will be noted that the cover 82 is provided with openings permitting access to the handles of the switches 74 and 75. If desired, an auxiliary cover 84 may be hinged to the trough receptacle for enclosing the handles of the switches 74 and 75, a suitable latch 85 being provided for the cover 84.

With the construction illustrated in Figs. 4, 5 and 6 it will be noted that the switch compartment 58 is substantially isolated from the socket compartment 57. Consequently, if the panel is wired at the factory the wiring may be completed during the installation of the panel merely by removing the wireway covers and the cover 82. Under these circumstances the manufacturer would provide conductors 86 extending from certain of the contact jaws 63 into the appropriate wireway 67. With such a construction, exposure of the compartment 58 in no way necessitates exposure of the compartment 57.

It will be understood that all parts of the trough receptacles, partition members and wireways may be constructed of sheet metal bent into the desired shape and attached to each other in any suitable manner as by machine bolts or welding.

It will be noted that the panel of Figs. 4, 5 and 6 provides positions for two meters. If a larger number of meters is desired the trough receptacles may be lengthened and/or two or more trough receptacles associated in side by side relation. Such an enlargement is illustrated in Figs. 7 and 8.

Referring to Figs. 7 and 8, it will be noted that two trough receptacles 90 and 91 are provided. Each of these trough receptacles is similar to the trough receptacle 50 of Figs. 4, 5 and 6 with the exception that each has been lengthened to provide positions for four meters and four associated switches. Otherwise the construction or each trough receptacle may be understood from the description of Figs. 4, 5 and 6. Because of the larger number of meter sockets a bus 92 is provided in each trough receptacle to replace the conductor 86 of Fig. 4. A bus 93 is employed to replace the bus 71 of Fig. 4 in order to reach all of the meter positions. If desired, line conductors may be attached to the respective buses 92 and 93 through terminals 92a and 93a.

The trough receptacles 90 and 91 are attached to each other in any suitable manner as by bolts or welding. This results in the formation of a rigid and compact panel which may be readily wired and installed. It will be noted further in Fig. 7 that a single wireway 94 or 95 is provided for each end of the trough receptacles 90 and 91 which extends completely across the trough receptacles. These wireways 94 and 95 contribute to the rigidity of the resulting structure. It will be noted additionally that a terminal block 96 is provided which is substantially larger than the terminal block 72 of Fig. 4 in order to provide additional terminals for the increased meter positions.

The construction of the covers in Fig. 8 will be understood from the description of Fig. 6. One of the auxiliary covers 97 for the switch handles is shown in closed position whereas the remaining auxiliary cover 98 for the switch handles is shown in open position. Moreover, in Fig. 8 detachable meters 99 are shown mounted in position on the covers 78.

By comparison of Figs. 4 to 8, it will be noted that an increase in meter positions does not require a different trough receptacle formation. All that is required is a lengthening of the trough receptacle and/or the association of a plurality of trough receptacles in abutting relationship. The covers 78 are standard for all of the constructions. It will be noted further that the switch cover 82a in Fig. 8 is approximately twice as long as that of the switch cover 82 in Fig. 6. Although this cover 82a may be broken into two sections substantially similar in length to the cover 82, the provision of a single cover facilitates its removal for wiring installations.

Inspection of Figs. 4 to 8 clearly demonstrates the unusual compactness, flexibility and good appearance of a panel designed in accordance with the invention.

In Figs. 7 and 8 the auxiliary switches 75 have been omitted for clarity in illustration.

In some cases the space available for installation of a meter panel is restricted or of peculiar configuration. Because of the flexibility of the panels designed in accordance with the invention, a panel may be constructed readily to conform with the space available. For example, in Fig. 9 a meter panel is illustrated which is of staggered formation suitable, for instance, for the wall of a staircase. In Fig. 9, three trough receptacles 100, 101 and 102 are provided which are similar except for length to the trough receptacle 50 of Fig. 4. It will be noted that in Fig. 9 no auxiliary covers for the switch handles are provided.

Fig. 9 illustrates further the flexibility of applicants' invention in the provision of a single wire-way 103. This wireway may be employed for enclosing electrical switches 104, 105 and 106 having operating handles extending through the cover of the wireways. Such switches may be employed as line switches or for supplying unmetered loads.

Figure 10:
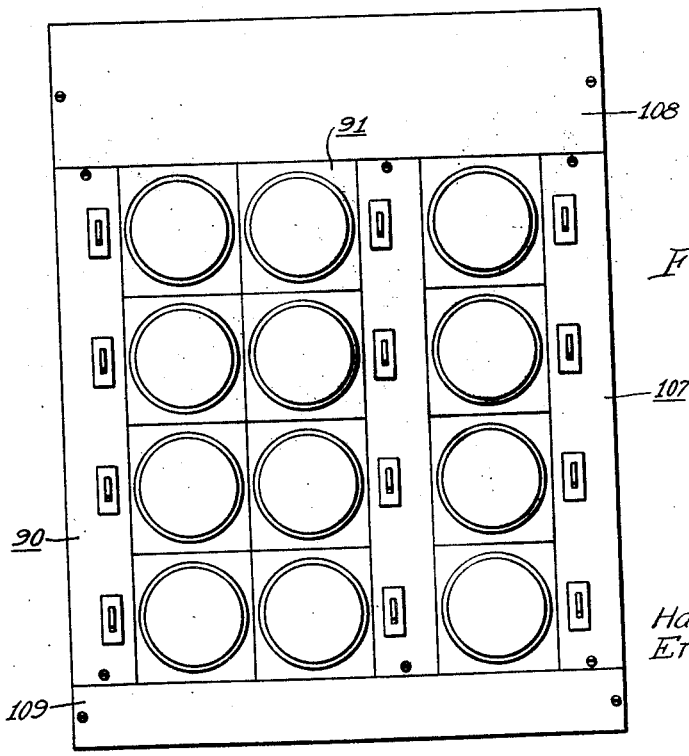

Fig. 10 shows a meter panel which is similar to the meter panel of Fig. 8 except for the addition of a third row of meters mounted on a third trough receptacle 107. In addition, Fig. 10 includes wireways 108 and 109 which have been extended over the third trough receptacle 107. It is believed that the construction of Fig. 10 will be apparent otherwise from the foregoing description of Figs. 4 to 8.

Figure 11:
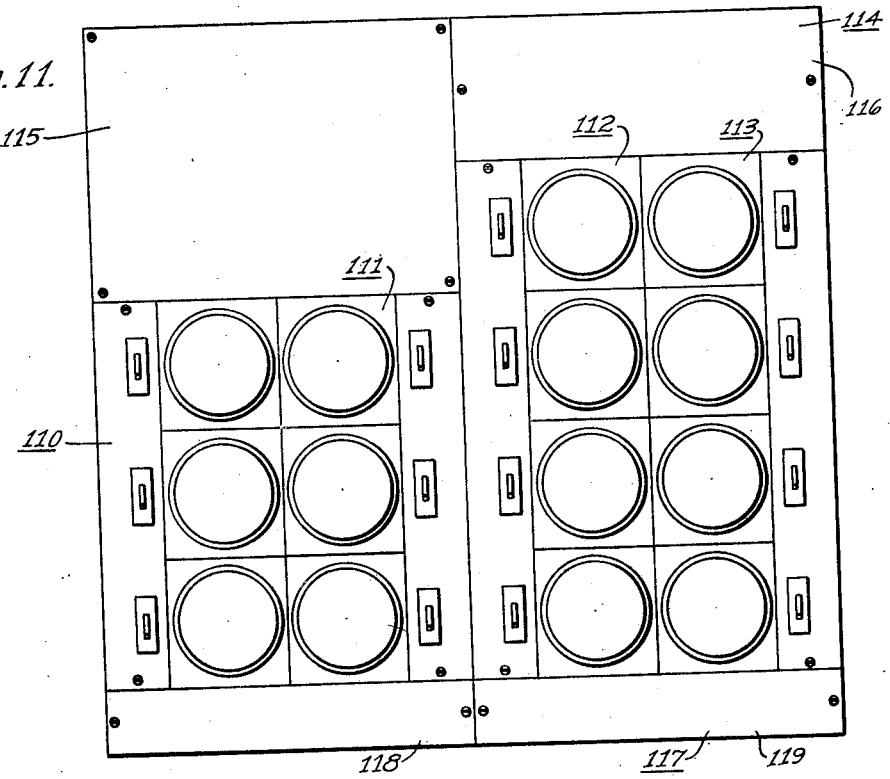

Fig. 11 discloses a panel which includes four trough receptacles 110 to 113 each similar except in length to the trough receptacle 50 of Fig. 4. It will be noted in Fig. 11 that two of the trough receptacles 110 and 111 are shorter than the neighboring trough receptacles 112 and 113. To compensate for this difference in length, a wireway 114 is employed having an enlargement over the trough receptacles 110 and 111. It will be noted that the wireway 114 is provided with two separate covers 115 and 116 for ease in handling. Similarly Fig. 11 includes a lower wireway 117 having two separate covers 118 and 119.

Fig. 12 shows a trough receptacle 120 designed for three detachable meters. This trough receptacle includes two partitions 121 and 122 each of which is similar in construction to the partition 56 of Figs. 4 and 5. Two switch compartments 123, 124 and one socket compartment 125 are formed by the two partitions. The socket compartment and the switch compartment 124 resemble the socket and switch compartments of Figs. 4 to 6. The switch compartment 123 provides auxiliary switches which may be employed in any desired manner. For example, the auxiliary switches may be employed for controlling unmetered circuits or they may be employed for controlling auxiliary switches when two or more load circuits are supplied through a single watthour meter. It will be noted that Fig. 12 includes a wireway 126 which extends across all three of the compartments. Since Fig. 12 adds a switch compartment 123 to the previously described construction illustrated in Figs. 4 to 6, it is believed that a further description of Fig. 12 is unnecessary. The cover for the switch compartment 123 may be similar to that employed for the switch compartment 124.

Figure 13:
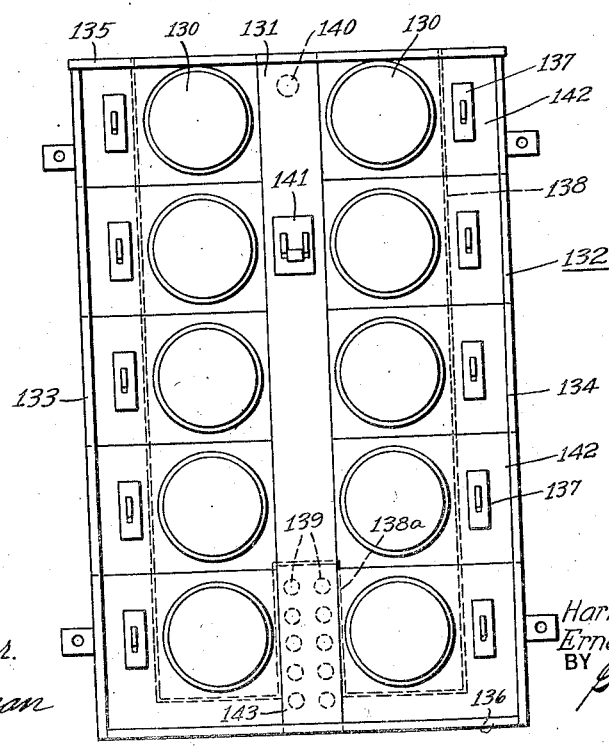

To conserve head room or for other reasons, it is sometimes desirable to omit the wireways herein referred to. Under such conditions service and load conductors may be introduced into the meter panel through knockouts as previously set forth. However, it may be desirable to provide a wireway which does not add to the height of the resulting panel. Such a wireway is disclosed in Fig. 13. As shown in Fig. 13, positions are provided for ten detachable watthour meters 130. The watthour meters are arranged in two rows between which the wireway 131 is located. If desired, the meters 130 may be inserted in trough receptacles similar to those illustrated in Figs. 4 to 8. However, in order to illustrate a further aspect of the invention, the entire mechanism is shown enclosed in a unitary box 132 having side walls 133 and 134, a top wall 135 and a bottom wall 136. Sockets for the meters 130 and switches 137 are arranged in the box receptacle 132 in a manner hereinbefore set forth. In addition, a barrier 138 is provided within the box for segregating the switches 137 from the sockets for the meters 130. It will be noted that the barrier 138 extends around the sockets for the meters 130 and is provided with extensions 138a for forming a suitable wiring space within the wireway 131. Knockouts 139 may be provided in the base wall of the box 134 to permit load circuits from the switches 137 to pass through the box 134. In addition, a knockout or conduit 140 may be provided in the wireway on the opposite side of the barrier 138 for the introduction of line conductors which may be connected to the sockets for the meters 130. An electrical switch 141 may be included in the wireway for operation as a line switch.

The covers for the panel of Fig. 13 differs slightly from those heretofore set forth. It will be noted that each of the meter positions, together with an adjacent electrical switch 137, is provided with a single cover 142 having openings as previously described for permitting access to the handles of the electrical switches and to permit the introduction of the contact pins or blades of the detachable watthour meters. These covers may be attached to the meter sockets in the manner hereinbefore set forth. A separate cover 143 may be provided for the wireway 141. If desired, brackets (not shown) may be provided where necessary for additionally supporting the various covers.

Figure 14:
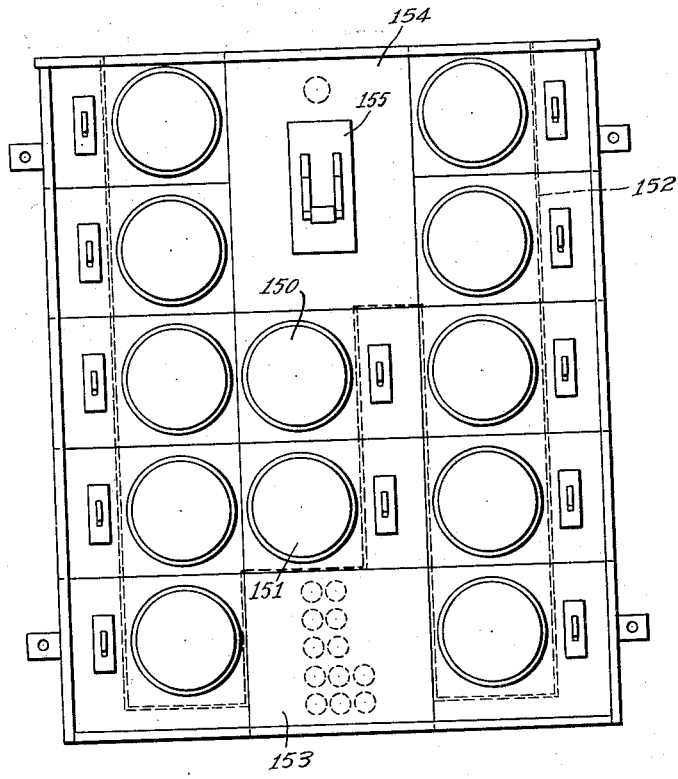
Figs. 13 and 14 are views in front elevation of modified meter panels embodying the invention.

Fig. 14 shows a panel similar in many respects to the panel of Fig. 13. In addition, however, Fig. 14 provides positions for two intermediate meters 150 and 151. A barrier 152 which corresponds to the barrier 138 is provided which includes an offset portion enclosing the switches for the meters 150 and 151. It will be noted that separate covers 153 and 154 are provided over the knockouts for the load conductors and service conductors, respectively. A line switch 155 may have an operating handle projecting through the cover 154. It is believed that the construction of the panel shown in Fig. 14 otherwise will be understood from the preceding discussion.

In Fig. 15 a box receptacle 160 is provided for enclosing the necessary sockets and electrical switches. As illustrated the box receptacle has a base wall 161, side walls 162 and 163, a top wall 164 and a bottom wall 165. If desired, partitions 166 and 167 may be provided which are similar to the partitions 56 of Figs. 4 and 5 for dividing the box receptacle 160 into three compartments, but such portions are not essential. In each of the outer compartments, two sockets 168 are located. Each pair of sockets is mounted on a common bracket 169 which may be attached to the rear wall of the box by any suitable means such as bolts 170.

The central compartment of the box contains four load switches 171, all of which are mounted on a common subbase 172 which is attached to the rear wall of the box 160 by suitable means such as bolts 173. If desired, a main breaker or line switch 174 also may be mounted in the central compartment. A terminal block 175 may be spaced in the central compartment for facilitating connections of the various parts.

It will be understood that the connections between the various switches and the appropriate sockets extend through the partitions 166 and 167 if the latter are employed.

As shown in Fig. 16, a separate cover 176 is provided for each of the meter positions. Each of the covers may be attached in the customary manner to the underlying socket and may be provided with the customary ring flange for receiving a detachable watthour meter 177. A separate cover 178 is provided for the central compartment and contains openings through which the operating handles for the various switches extend.

A still further modification is illustrated in Figs. 17 to 19. In these figures, a box receptacle 180 is provided with a rear wall 181, side walls 182 and 183, a top wall 184 and a bottom wall 185. If desired, a partition 186 similar in construction to the partition 56 of Figs. 4 and 5 may be provided for dividing the box 180 into two compartments. In each of the compartments a subassembly 187 is positioned. The subassembly is shown more clearly in Fig. 18.

The subassembly of Fig. 18 includes a subbase 188 which carries two meter sockets 189 and 190. In addition the subbase carries a number of electrical switches 191. Each subbase may be attached in position to the rear wall of the box 180 by suitable means such as bolts 192 extending through openings 193 provided in the rear wall. The complete box may be mounted in position on a wall by means of bolts or screws 194.

In assembling the structure shown in Figs. 17 and 18 each of the subassemblies may be wired substantially before insertion in the box 180. Final circuit connections then may be completed after the subassemblies have been mounted in position in the box 180. If desired, a terminal block 195 may be located in one or both of the compartments of the box receptacle for facilitating connections of the sockets and switches.

From an inspection of Fig. 19 it will be noted that the box 180 is provided with two covers 196 and 197 having openings through which the handles of the switches extend and having openings for the reception of detachable watthour meters 198. The covers may be retained in position by machine screws in the manner hereinbefore described.

Each socket in Figs. 17 and 18 is illustrated as having two circuit closers 199 which may be of the type illustrated in the aforesaid Bradshaw et al. Patent 2,096,479. As well understood in the art such a construction is suitable for three wire, single phase service, but other socket connections known in the art may be employed to accommodate the desired service.

Although the invention has been disclosed with reference to certain embodiments thereof, it is obvious that many numerous modifications thereof are possible. The invention therefore is to be restricted only by the appended claims when interpreted in view of the prior art.

We claim as our invention:

1. In a detachable instrument panel, three trough receptacles each comprising an open-front U-shaped channel having parallel side walls, said trough receptacles being disposed in side-by-side abutting relationship, means for attaching said trough receptacles in said relationship, a plurality of contact units in each of said trough receptacles, each of said contact units being designed to receive detachably a detachable electrical instrument, and cover means for said trough receptacles, said cover means having openings permitting introduction of electrical instruments to said contact units.

2. In a detachable instrument panel, a plurality of trough receptacles each comprising a U-shaped channel having parallel side walls and having an open front, said trough receptacles being disposed in side-by-side abutting relationship, means for attaching said trough receptacles in said relationship, a plurality of contact units in each of said trough receptacles, each of said contact units being designed to receive detachably a detachable electrical instrument applied to the front of the associated trough receptacles, a wireway extending across the ends of said trough receptacles substantially in abutting relationship thereto, and cover means for said wireway and trough receptacles, said cover means having openings permitting introduction of electrical instruments to said contact units.

3. In a detachable instrument panel, a pair of spaced, parallel wireways, each of said wireways comprising a housing channel and cover means for said channel, a plurality of trough receptacles extending between said wireways in side-by-side abutting relationship, said trough receptacles having open fronts, means for attaching said wireways and trough receptacles directly to each other for maintaining said abutting relationship, a plurality of contact units in each of said trough receptacles, each of said contact units having contact jaws for receiving detachably a detachable electrical meter, and a separate cover for each of said contact units, said covers cooperating with said electrical meters, when the latter are in mounted position, for closing said trough receptacles, the surfaces of said wireways adjacent said trough receptacles having openings permitting conductors to pass directly from said trough receptacles into said wireways without exposure.

4. In a detachable instrument panel, a pair of spaced, parallel wireways, each of said wireways comprising a housing channel and cover means for said channel, a plurality of open-front trough receptacles extending between said wireways in side-by-side abutting relationship, means for attaching said wireways and trough receptacles directly to each other for maintaining said abutting relationship, a plurality of contact units in each of said trough receptacles, each of said contact units having contact jaws for receiving detachably a detachable electrical meter, a separate cover for each of said contact units, said covers cooperating with said electrical meters, when the latter are in mounted position, for closing said trough receptacles, and means for preventing removal of said cover means from said wireways until certain of said separate covers are removed from their associated trough receptacles, the surfaces of said wireways adjacent said trough receptacles having openings permitting conductors to pass directly from said trough receptacles into said wireways without exposure.

5. In a detachable electrical instrument mounting, a plurality of trough receptacles positioned in side-by-side abutting relationship, a plurality of contact units in each of said trough receptacles, each of said contact units being designed for detachably receiving a detachable electrical instrument introduced from the front of the associated trough receptacle, a plurality of circuit interrupting devices designed to open in response to overload in each of said trough receptacles, and electrical connection means extending between said contact units and said circuit interrupting means in each of said trough receptacles, and a substantially enclosed wireway positioned in substantial abutment with the ends of said trough receptacles, said wireway extending substantially perpendicular to said trough receptacles, and having openings communicating with the interiors of said trough receptacles.

6. In a detachable electrical instrument mounting, a plurality of trough receptacles positioned in side-by-side abutting relationship, each of said trough receptacles comprising a substantially continuous channel having parallel side walls, a plurality of spaced contact units positioned in each of said channels, each of said contact units being designed for detachably receiving a detachable electrical instrument, a plurality of circuit interrupting devices designed to open in response to overload in each of said channels, one of said interrupting devices being positioned adjacent each of said contact units, and electrical connecting means for connecting each of said contact units to its adjacent circuit interrupting device, and a substantially enclosed wireway positioned in substantial abutment with ends of said trough receptacles, said wireway extending substantially perpendicular to said trough receptacles, and having openings permitting the passage of conductors from said trough receptacles directly into said wireway.

7. In a detachable instrument mounting, a pair of spaced parallel wireways, a plurality of trough receptacles extending between said wireways substantially in side-by-side abutting relationship, means directly connecting said wireways and receptacles to form a substantially rigid, independent structure, a plurality of contact units in said trough receptacles, a plurality of electrical switches designed to open in response to overload in said trough receptacles, each of said contact units being designed for detachably receiving a detachable electrical instrument, and electrical connecting means for connecting said electrical switches to said contact units, the surfaces of said wireways adjacent said trough receptacles being perforated to permit passage of conductors from said trough receptacles into said wireways substantially without exposure.

8. In a panel-type meter assembly, a plurality of detachable meters each having contact blades projecting therefrom, a plurality of contact units each having contact jaws for detachably receiving the contact blades of one of said meters, a plurality of electrical switches, electrical connecting means for connecting each of said switches to a separate one of said contact units, three side-by-side abutting trough receptacles for housing said electrical switches and said contact units, said trough receptacles having open fronts permitting application of said detachable meters to said contact units, and cover means cooperating with said detachable meters for closing said trough receptacles, said cover means including individual covers each removable for exposing a single contact unit and its associated switch.

9. In a detachable instrument assembly, a plurality of detachable instruments having projecting contact blades, a plurality of U-shaped open-front trough receptacles arranged in side-to-side abutting relationship, a plurality of spaced contact units in each of said trough receptacles, each of said contact units having contact jaws for detachably receiving the contact blades of one of said detachable instruments introduced from the front of the associated trough receptacle, a plurality of automatic overload electrical switches having manual operating handles in each of said trough receptacles, each of said switches being adjacent a separate one of said contact units, electrical connecting means extending from each of said switches to the adjacent one of said contact units, a separate cover for each of said contact units, each of said covers having an opening for permitting entry of the contact blades of one of said detachable instruments into the contact jaws of the associated contact unit, and having an opening providing access for the manual operating handle of the adjacent one of said electrical switches; wireway means extending across and abutting the ends of said trough receptacles, means directly attaching said wireway means and receptacles to each other to form an independent rigid structure, and electrical wiring extending from each of said trough receptacles into said wireway means.

10. In a detachable electrical instrument mounting, a trough receptacle comprising a substantially continuous open-front channel having parallel side walls and having an auxiliary wall intermediate said side walls and substantially parallel thereto for defining a plurality of compartments, a plurality of spaced contact units positioned in a first one of said compartments, each of said contact units being designed for detachably receiving a detachable electrical instrument introduced from the front of the channel, a plurality of substantially continuous common conductors in said first compartment for supplying electrical energy to all of said contact units, a plurality of circuit interrupting devices in a second one of said compartments, one of said interrupting devices being positioned adjacent each of said contact units but on the opposite side of said auxiliary wall therefrom, electrical connecting means extending through said auxiliary wall for connecting each of said contact units to its adjacent circuit controlling device, a separate cover member for each of said contact units, said cover members cooperating with detachable electrical instruments, when the latter are associated with said contact units, for closing said first compartment, and a single cover member for closing said second compartment.

11. In a detachable electrical instrument mounting, a plurality of open-front trough receptacles positioned in side-by-side, abutting relationship, each of said trough receptacles comprising a partition member positioned within said trough receptacle for defining a plurality of compartments therein, a plurality of contact units in a first one of said compartments, each of said contact units being designed for detachably receiving a detachable electrical instrument applied from the front of the associated trough receptacle, a plurality of circuit interrupting devices in a second one of said compartments operable from the front of the associated receptacle, and electrical connection means extending between said contact units and said circuit interrupting devices, said circuit interrupting devices being designed to open in response to overload.

12. In a detachable electrical instrument mounting, a plurality of open-front trough receptacles positioned in side-by-side abutting relationship, each of said trough receptacles comprising a partition member positioned within said trough receptacle for defining a plurality of compartments therein, a plurality of contact units in a first one of said compartments, each of said contact units being designed for detachably receiving a detachable electrical instrument applied from the front of the associated trough receptacle, a plurality of circuit interrupting devices in a second one of said compartments operable from the front of the associated trough receptacle, electrical connection means extending between said contact units and said circuit interrupting devices, a substantially enclosed wireway positioned in abutment with ends of said trough receptacles, conductor means extending from said wireway directly into said trough receptacles to engage said contact units and said devices, said wireway extending substantially perpendicular to said trough receptacles, and means attaching said wireway and trough receptacles to each other to form an independent structure.

13. In a detachable electrical instrument mounting, a plurality of trough receptacles positioned in side-by-side abutting relationship, each of said trough receptacles comprising a substantially continuous open-front channel having parallel side walls and having an auxiliary wall intermediate said side walls and substantially parallel thereto for defining a plurality of compartments, a plurality of spaced contact units positioned in a first one of said compartments, each of said contact units being designed for detachably receiving a detachable electrical instrument, a plurality of circuit interrupting devices designed to open in response to overload in a second one of said compartments, one of said interrupting devices being positioned adjacent each of said contact units but on the opposite side of said auxiliary wall therefrom, and electrical connecting means extending through said auxiliary wall for connecting each of said contact units to its adjacent circuit interrupting device, a substantially enclosed wireway positioned substantially in abutment with ends of said trough receptacles and having openings communicating directly with said trough receptacles, said wireway extending substantially perpendicular to said trough receptacles and independent cover means for each of said compartments, said cover means having openings permitting passage of parts of detachable electrical instruments to said contact units and passage of control parts of said interrupting devices.

14. In a detachable instrument mounting, a pair of spaced parallel wireways, a plurality of open-front trough receptacles extending between said wireways substantially in side-by-side abutting relationship, a plurality of contact units in certain only of said trough receptacles, a plurality of electrical switches in the remainder of said trough receptacles, each of said contact units being designed for detachably receiving a detachable electrical instrument introduced from the front of the associated trough receptacle, and electrical connecting means for connecting said electrical switches to said contact units.

15. In a detachable instrument mounting, a pair of spaced parallel wireways, a plurality of open-front trough receptacles extending between said wireways substantially in side-by-side abutting relationship, a plurality of contact units in certain only of said trough receptacles, a plurality of electrical switches in the remainder of said trough receptacles, each of said contact units being designed for detachably receiving a detachable electrical instrument introduced from the front of the associated trough receptacle, electrical connecting means for connecting said electrical switches to said contact units, a separate cover for each of said contact units, and a single cover for each of said switch containing trough receptacles, said covers cooperating with detachable instruments, when the latter are in mounted positions, for closing said trough receptacles.

16. In a panel-type meter mounting, a pair of spaced parallel wireways, a plurality of open-front trough receptacles extending between said wireways and defining four side-by-side abutting compartments extending between said wireways, a plurality of spaced contact units in each of the inner pair of said compartments, each of said contact units having contact jaws for detachably receiving the contact blades of a detachable watthour meter, a plurality of electrical switches in the outer pair of said compartments, a separate cover for each of said contact units each of said covers having an opening for permitting passage of the contact blades of a detachable watthour meter into engagement with said contact jaws, common conductors for each of said inner pair of trough receptacles for supplying energy to the contact units, electrical connection means extending between said contact units and said electrical switches for supplying energy from said contact units through said electrical switches to external loads, a single cover for each of said outer pair of trough receptacles, means mounting said first-named covers for removal independently of said single covers, said covers cooperating, when detachable instruments are in mounted position on said contact units, to close said compartments, and conductive means extending from said wireways into said trough receptacles to conduct current passing through said contact units and said switches.

17. In a detachable instrument assembly; a plurality of detachable instruments having projecting contact blades; a plurality of U-shaped trough receptacles arranged in side-to-side, abutting relationship, each of said trough receptacles including a partition extending along the length of said partition for defining a pair of compartments, a plurality of spaced contact units in a first one of said compartments, each of said contact units having contact jaws for detachably receiving the contact blades of one of said detachable instruments, a plurality of electrical switches having manual operating handles in a second one of said compartments, each of said switches being designed to open in response to overload and being positioned adjacent a separate one of said contact units, electrical connecting means extending from each of said switches through said partition to the adjacent one of said contact units, a separate cover for each of said contact units, each of said covers having an opening for permitting entry of the contact blades of one of said detachable instruments into the contact jaws of the associated contact unit, a single cover for said second compartment, said single cover having openings providing access for the manual operating handles of said electrical switches, and means mounting said covers for permitting opening of either of said compartments independently of the other compartment; wireway means extending across and abutting the ends of said trough receptacles, and electrical wiring extending from each of said compartments into said wireway means.

HARRY P. SPARKES.
ERNEST G. JOHANSSON.